United States Patent
Le et al.

(10) Patent No.: US 11,093,393 B2
(45) Date of Patent: Aug. 17, 2021

(54) SYSTEM AND METHOD FOR EARLY DRAM PAGE-ACTIVATION

(71) Applicant: Samsung Electronics Co., Ltd., Suwon-si (KR)

(72) Inventors: Hien Le, Cedar Park, TX (US); Junhee Yoo, Gyeonggi-do (KR); Vikas Kumar Sinha, Austin, TX (US); Robert Bell, Austin, TX (US); Matthew Derrick Garrett, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/289,650

(22) Filed: Feb. 28, 2019

(65) Prior Publication Data
US 2020/0210337 A1 Jul. 2, 2020

Related U.S. Application Data

(60) Provisional application No. 62/785,661, filed on Dec. 27, 2018.

(51) Int. Cl.
| | |
|---|---|
| *G06F 12/00* | (2006.01) |
| *G06F 13/00* | (2006.01) |
| *G06F 12/0815* | (2016.01) |
| *G06F 12/0882* | (2016.01) |
| *G06F 3/06* | (2006.01) |
| *G06F 13/16* | (2006.01) |

(52) U.S. Cl.
CPC ........ *G06F 12/0815* (2013.01); *G06F 3/0611* (2013.01); *G06F 3/0659* (2013.01); *G06F 12/0882* (2013.01); *G06F 13/1668* (2013.01); *G06F 3/0679* (2013.01)

(58) Field of Classification Search
CPC ............. G06F 12/0815; G06F 12/0882; G06F 3/0611; G06F 3/0659; G06F 3/0679; G06F 13/1668
USPC .......................................................... 711/3
See application file for complete search history.

(56) References Cited

U.S. PATENT DOCUMENTS

| | | | |
|---|---|---|---|
| 7,015,921 B1 * | 3/2006 | Trivedi | G06F 12/0831 345/520 |
| 7,213,082 B2 * | 5/2007 | Jeddeloh | G06F 12/0215 710/15 |
| 7,984,357 B2 | 7/2011 | Kirscht et al. | |
| 9,158,685 B2 * | 10/2015 | Biswas | G06F 12/126 |

(Continued)

*Primary Examiner* — Sheng Jen Tsai
(74) *Attorney, Agent, or Firm* — Renaissance IP Law Group LLP (57) ABSTRACT

A system and a method provide a memory-access technique that effectively parallelizes DRAM operations and coherency operations to reduce memory-access latency. The system may include a memory controller, an interconnect and a processor. The interconnect may be coupled to the memory controller. The processor may be coupled to the memory controller through a first path and a second path in which the first path is through the interconnect and the second path bypasses the interconnect. The processor may be configured to send substantially concurrently a memory access request to the memory controller via the first path and send a page activation request or a hint request to the memory controller via the second path so that the DRAM access operations appear to be masked, or hidden by the coherency operations.

16 Claims, 4 Drawing Sheets

(56) References Cited

U.S. PATENT DOCUMENTS

| | | | |
|---|---|---|---|
| 9,201,796 B2* | 12/2015 | Biswas | G06F 1/3275 |
| 9,231,618 B2 | 1/2016 | Goodman et al. | |
| 9,405,712 B2* | 8/2016 | Fleischer | G06F 3/0659 |
| 10,498,783 B2* | 12/2019 | Turrie | H04L 65/4076 |
| 2003/0191913 A1* | 10/2003 | Holman | G06F 12/0215 |
| | | | 711/156 |
| 2004/0098747 A1* | 5/2004 | Kay | H04N 5/44543 |
| | | | 725/95 |
| 2007/0201383 A1* | 8/2007 | Ong | H04L 41/12 |
| | | | 370/254 |
| 2007/0234112 A1* | 10/2007 | Thayer | G11C 29/76 |
| | | | 714/6.13 |
| 2008/0109565 A1* | 5/2008 | Ajanovic | G06F 1/3253 |
| | | | 710/8 |
| 2012/0314520 A1* | 12/2012 | Vogelsang | G11C 8/14 |
| | | | 365/200 |
| 2014/0049572 A1* | 2/2014 | Sacchetto | G09G 3/3406 |
| | | | 345/691 |
| 2014/0208132 A1* | 7/2014 | Cheston | H04L 29/08072 |
| | | | 713/310 |
| 2015/0295800 A1* | 10/2015 | Bala | H04L 67/2809 |
| | | | 709/224 |
| 2016/0055052 A1* | 2/2016 | Hu | G06F 11/1048 |
| | | | 714/799 |
| 2016/0055058 A1* | 2/2016 | Zheng | G06F 11/10 |
| | | | 714/764 |
| 2016/0055059 A1* | 2/2016 | Hu | G06F 11/10 |
| | | | 714/764 |
| 2016/0266975 A1* | 9/2016 | Hu | G06F 12/1009 |
| 2017/0060460 A1* | 3/2017 | Sugahara | G06F 3/0658 |
| 2018/0225209 A1* | 8/2018 | Mannava | G06F 12/0897 |
| 2019/0155516 A1* | 5/2019 | Bhargava | G06F 3/0611 |
| 2020/0019513 A1* | 1/2020 | Kozhikkottu | G06F 12/0851 |
| 2020/0186427 A1* | 6/2020 | Chunduru Venkata | H04L 41/0886 |

* cited by examiner

SYSTEM AND METHOD FOR EARLY DRAM PAGE-ACTIVATION

CROSS-REFERENCE TO RELATED APPLICATION

This patent application claims the priority benefit under 35 U.S.C. § 119(e) of U.S. Provisional Patent Application No. 62/785,661, filed on Dec. 27, 2018, the disclosure of which is incorporated herein by reference in its entirety.

TECHNICAL FIELD

The subject matter disclosed herein generally relates to processing systems. More specifically, the subject matter disclosed herein relates to a system and a method for providing speculative page activations to a system memory.

BACKGROUND

Figure 1A:
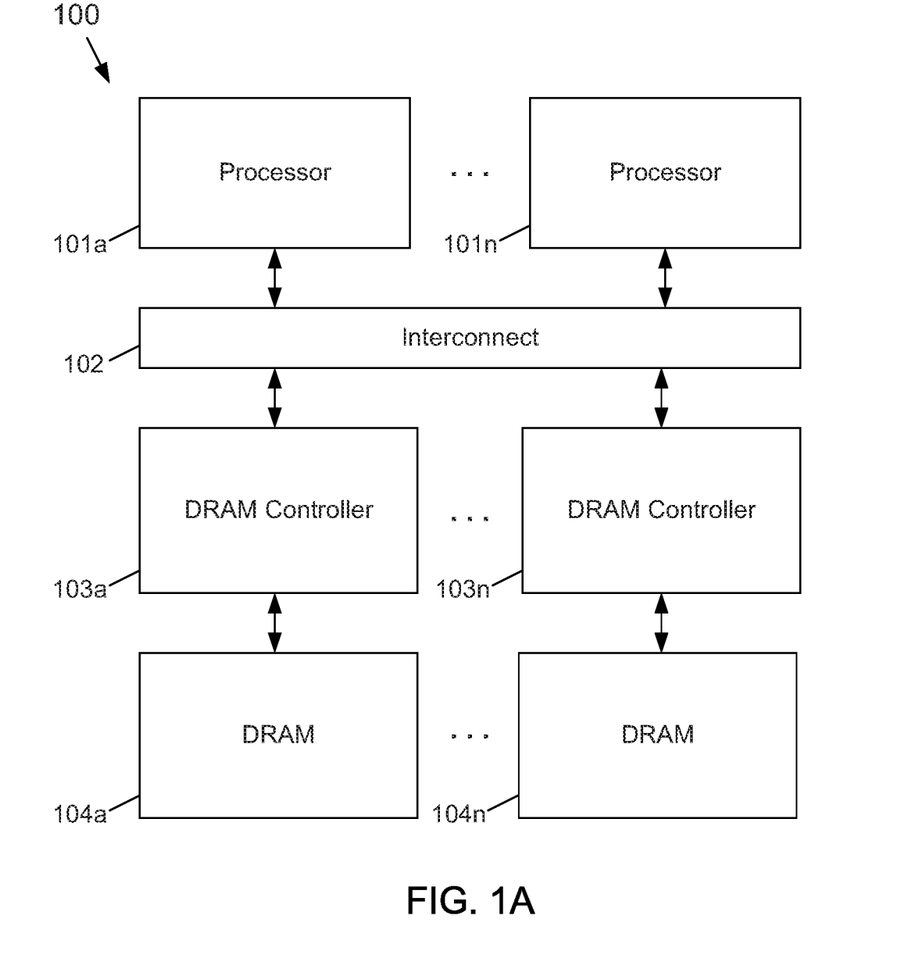
FIG. 1A depicts a functional block diagram of a typical system on a chip (SoC)

Memory-access latency directly impacts performance of a computing system. FIG. 1A depicts a functional block diagram of a typical system on a chip (SoC) 100. The SoC 100 may include one or more processors 101a-101n, a coherent interconnect 102, one or more memory (DRAM) controllers 103a-103n, and one or more memories 104a-104n. The memories 104 may be a dynamic random access memory (DRAM). In operation, a processor 101 may send a memory access request through the coherent interconnect 102 to a memory controller 103. The memory controller 103 performs DRAM operations, such as DRAM page closing, DRAM page activation, and DRAM access, and the requested data is then returned back through the interconnect 102 to the processor 101.

The total memory-access latency for the SoC 100 may include a latency associated with the requesting device (i.e., a processor 101), a clock-domain crossing (CDC) latency, a latency associated with cache coherency components (i.e., cache and snoop filter (SF) look-up), a latency of the interconnect 102 (i.e., arbitration and serialization), and latencies associated with DRAM page closing, DRAM page activation, DRAM access and data return.

Figure 1B:
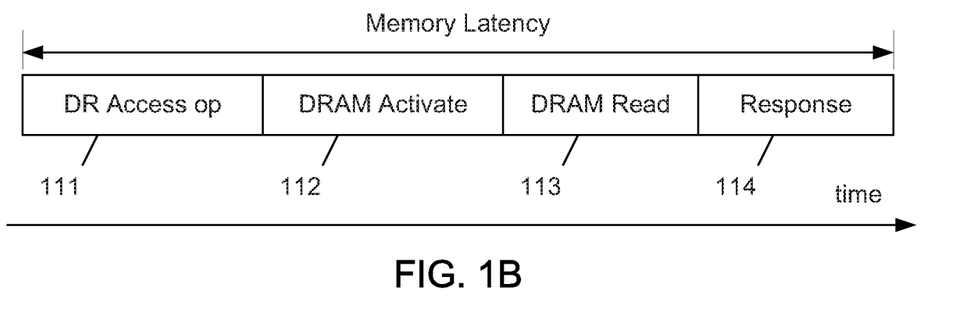
FIG. 1B depicts a memory-access latency associated with a typical memory controller and an associated typical DRAM memory of the typical SoC of FIG. 1.

FIG. 1B depicts a memory-access latency associated with a typical memory controller 103 and an associated typical DRAM memory 104. The latency related to DRAM access request (entire request path) is represented at 111. The latency related to DRAM activation is represented at 112. The latency related to a DRAM read is represented at 113, and the interconnection latency related to providing the response to the requester is represented at 114.

SUMMARY

An example embodiment provides a system that may include a memory controller, an interconnect and a processor. The interconnect may be coupled to the memory controller, and the processor may be coupled to the memory controller through a first path and a second path in which the first path may be through the interconnect and the second path may bypass the interconnect. The processor may be configured to send substantially concurrently a memory access request to the memory controller via the first path and send a page activation request or a hint request to the memory controller via the second path. In one embodiment, the processor may be further configured to dynamically determine whether to send a memory access request via the second path based on a type of the memory access request or a current power/performance state of the system.

Another example embodiment provides a computing system that may include a processor, a coherent interconnect and a memory controller. The coherent interconnect may be coupled to the processor, and the memory controller may be coupled to the processor through a first path and a second path in which the first path may be through the coherent interconnect and the second path may bypass the coherent interconnect. The memory controller may be configured to receive substantially concurrently a memory access request from the processor via the first path and receive a page activation request or a hint request from the processor via the second path. In one embodiment, the memory controller may be further configured to dynamically determine whether to respond to the memory access request via the second path based on a type of the memory access request or a current power/performance state of the computing system.

Still another example embodiment provides a method to access a memory may include: receiving at a memory controller a page activation request or a hint request over a first path that was sent to the memory controller substantially concurrently with a memory access request over a second path, the first path bypassing an interconnect connected to the memory controller and the second path being through the interconnect, the page activation request or the hint request including a page address; and activating by the memory controller a page of the memory corresponding to the page address in response to the page activation request or the hint request prior to accessing the memory in response to the memory access request if the memory controller determines that the page of the memory corresponding to the page activation request or the hint request is not already open. In one embodiment, the method may further include dynamically determining by the memory controller wherein the memory controller dynamically determine to respond to the memory access request via the second path based on a type of the memory access request or a current power/performance state of the memory controller.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "module," as used herein, refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth.

The subject matter disclosed herein provides a memory-access technique that effectively parallelizes DRAM operations and coherency operations to reduce memory-access latency. In one embodiment, latency associated with DRAM access operations, such as a DRAM page close operation and/or a DRAM page activation, may occur concurrently with coherency operations so that the DRAM access operations appear to be masked, or hidden. The reduced memory-access latency is achieved without an overly complex technique by using, for example, out-of-band signaling that may initiate the DRAM access operations in parallel with cache coherency operations, thereby masking, or hiding, the latencies associated with the DRAM access operations by the latencies associated with the cache coherency operations, clock-domain crossing and/or interconnection latency. The out-of-band signaling may include an "early" page activation request that is speculatively sent by a processor for a potential forthcoming memory access request.

In one embodiment, a memory controller that receives the out-of-band signaling may selectively not respond to the out-of-band signaling depending on a workload being experienced by the memory controller. That is, the memory controller may be configured to receive the out-of-band signaling as a hint that may be selectively ignored based on the workload of the memory controller. If the memory controller selects to respond to the hint and accesses particular data in the DRAM, and if the accessed data is not needed or up to date, the data may be dropped without affecting system functionality. Thus, the transport mechanism may be lossy insofar as some transported data may be dropped, but the overall system functionality is not adversely affected. In another embodiment, the out-of-band signaling may include an indication of a priority associated with an early page activation request, and the memory controller may selectively ignore the indication of priority based on a workload being experienced by the memory controller, a type of access (i.e., read or write, demand request or pre-fetch request), and/or a current power/performance state.

The subject matter disclosed herein also provides an improved power efficiency for a processing system because a DRAM page is activated only if the page is not already open. The memory controller has the discretion to send a memory page activation command to the DRAM if such a command is actually needed. Accordingly, in view of the relatively slow rate involved with a DRAM page activation in comparison to a read request, one page activation may be sufficient for multiple read accesses. Additionally, an out-of-band memory page activation request may be sent if the performance/power tradeoff is acceptable. Further, an outof-band memory page request provides routing efficiency because a full address bus is not needed only the DRAM page address is needed.

Figure 2A:
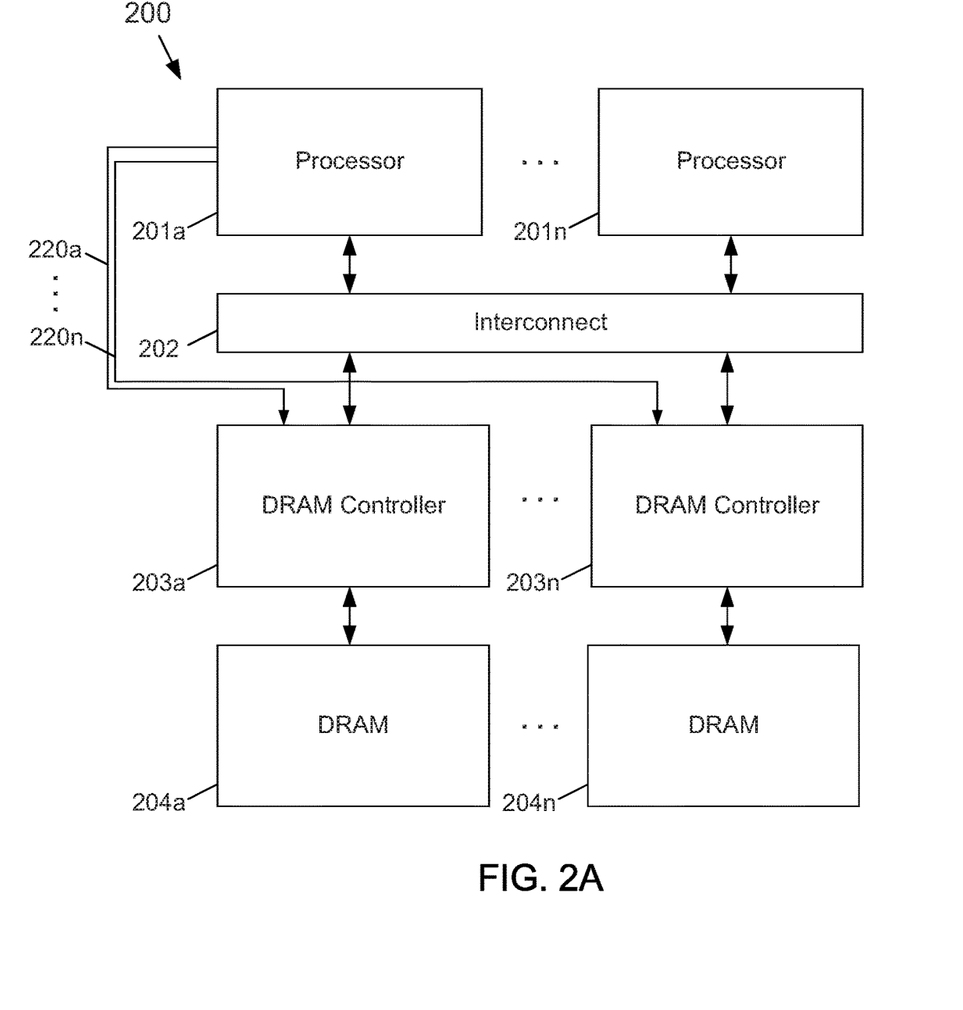
FIG. 2A depicts a functional block diagram of one example embodiment of a computing system according to the subject matter disclosed herein.

FIG. 2A depicts a functional block diagram of one example embodiment of a computing system 200 according to the subject matter disclosed herein. In one embodiment, the computing system 200 may be configured as an SoC. The computing system 200 may include one or more processors 201a-201n, an interconnect 202, one or more memory (DRAM) controllers 203a-203n, and one or more memories 204a-204n. The interconnect 202 may be a coherent interconnect or non-coherent interconnect. The memories 204 may be dynamic random access memory (DRAM). In one embodiment, a memory controller 203 and a corresponding memory 204 may be embodied as a memory module.

In one operating mode, the computing system 200 may perform a memory access in a manner similar to the typical SoC 100 depicted in FIG. 1A. More specifically, a processor 201 may send a memory access request through the coherent interconnect 202 to a memory controller 203. The memory controller 203 performs DRAM operations, such as DRAM page closing, DRAM page activation, and DRAM access, to access the requested data and the requested data is then returned back through the interconnect 202 to the processor 201. In this operating mode, no reduced memory-access latency may be provided in comparison to the SoC 100 depicted in FIG. 1A.

In another operating mode, the computing system 200 utilizes a memory-access technique that effectively parallelizes DRAM operations and coherency operations to reduce memory-access latency. In particular, the computing system 200 includes out-of-band signaling lines 220a-220n that bypass the interconnect 202 to provide an early page activation request from a processor 201 directly to a memory controller 203. The out-of-band signaling lines 220a-220n may also be referred to as speculative DRAM activation paths. In one embodiment, separate out-of-band signaling lines are provided from a processor 201 to each memory controller 203. It should be understood that although the out-of-band signaling lines 220a-220n are depicted for only processor 201a, corresponding out-of-band signaling lines 220a-220n may also be provided for one or more processors 201b-201n. In one embodiment, an early page activation request may include an indication that the early page request is associated with a demand request or a pre-fetch request. In one embodiment, the processor may send an early page request via the out-of-band signaling while the internal caches of the processor are being queried to further mask, or hide, the memory-access latency if the DRAM is to be accessed.

In one embodiment, a processor 201 may dynamically determine to send an early page activation requests based on a type of access (i.e., read or write, demand request or pre-fetch request), a current power/performance state. For example, if the processor 201 is in a high performance state, the processor 201 may determine to send early page activation requests more frequently than if the processor 201 is in a lower power, lower performance state. In one embodiment, a processor 201 may only need to send one early page activation request if there are multiple accesses to the same DRAM page over a short period of time.

In one embodiment, a memory controller 203 may be configured to respond to an early page activation request when received. In one embodiment, a memory controller 203 may selectively activate (i.e., open a new page) without any pre-charging (i.e., closing any other page) in response to receiving an early page activation request. In another embodiment, a memory controller 203 may selectively pre-charge (i.e., close a page) in order to activate a page (i.e., open a new page). In still another embodiment, a memory controller 203 may selectively pre-charge (i.e., close a page) with no page activations.

In another embodiment, a memory controller 203 may be configured so that the out-of-band signalling is received by the memory controller 203 as a hint and the memory controller 203 may selectively not respond to the out-of-band signaling depending on, for example, a workload being experienced by the memory controller. A memory controller 203 may dynamically determine to respond to an early page activation requests based on a workload being experienced by the memory controller, a type of access (i.e., read or write, demand request or pre-fetch request), and/or a current power/performance state.

Figure 2B:
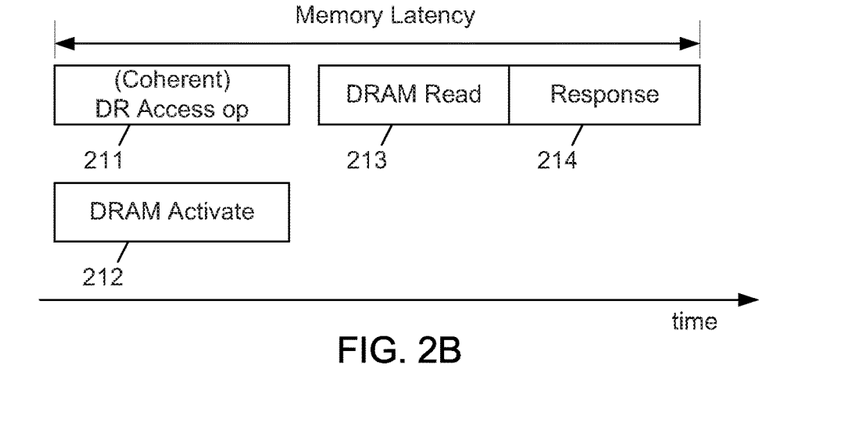
FIG. 2B depicts memory-access latency provided by the computing system utilizing a memory-access technique that parallelizes DRAM operations and coherency operations according to the subject matter disclosed herein.

FIG. 2B depicts memory-access latency provided by the computing system 200 utilizing a memory-access technique that parallelizes DRAM operations and coherency operations according to the subject matter disclosed herein. The latency relating to the coherent interconnect 202 represented at 211 is substantially simultaneous with the latency relating to an out-of-band DRAM page activation request represented at 212. The latency related to a DRAM read is represented at 213, and the interconnection latency related to providing the response to the requester is represented at 214. When compared to the memory-access latency depicted in FIG. 1B, the memory-access latency depicted in FIG. 2B has been reduced.

In one embodiment, the out-of-band signaling may additionally or alternatively include a page pre-charge request/hint. The memory controller may be configured to determine whether a pre-charge operation is needed even if the corresponding page has not yet timed out. For example, an open page that is a target of a forthcoming memory access may be close to timing out, and the memory controller may determine that it is advantageous to pre-charge the open page early along with an activate command.

Figure 3:
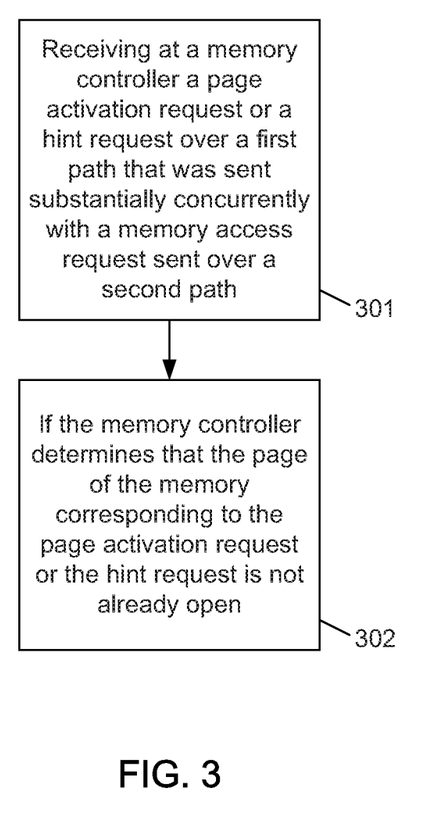
FIG. 3 depicts a flowchart for a memory-access method that effectively parallelizes DRAM operations and coherency operations to reduce memory-access latency according to the subject matter disclosed herein.

FIG. 3 depicts a flowchart for a memory-access method that effectively parallelizes DRAM operations and coherency operations to reduce memory-access latency according to the subject matter disclosed herein. At 301, a page activation request (or a hint request) may be received over a first path by receiving at a memory controller, such as memory controller 203. The page activation request (or the hint request) was sent to the memory controller substantially concurrently with a memory access request over a second path in which the first path bypasses an interconnect, such as interconnect 202, that is connected to the memory controller and the second path is through the interconnect. In one embodiment, the page activation request (or the hint request) may include, but is not limited to, a page address.

At 302, if the memory controller determines that the page of the memory corresponding to the page activation request or the hint request is not already open, then the memory controller activates the page of the memory corresponding to the page address in response to the page activation request (or the hint request) prior to accessing the memory in response to the memory access request.

In one embodiment, out-of-band requests may be prioritized for a decision process used by the memory controller to determine whether to pre-charge and/or activate a DRAM page for a particular request. For example, demand memory accesses may be prioritized over pre-fetches, so if the workload of the controller is heavy, the memory controller may determine to only pre-charge and/or activate a request DRAM page.

In another embodiment, early page activation may be dynamically enabled by a processor 201 and/or by a memory controller 203 based on a moving average of cycles between an early page activation and the corresponding demand request. For example, if the average number of cycles between an early page activation and the corresponding demand request exceeds a predetermined threshold, then the early page activation functionality may be disabled because the average number of cycles is indicating that the early page activation is too early and an pre-charge or activation resulting from the early page activation may be in a wrong location in the DRAM.

In one embodiment, if the workload of a memory controller is heavy, then early page activation may be disable to avoid thrashing of page activates.

In one embodiment, early page activations may be disabled by either a processor 201 and/or a memory controller 203 for particular conditions or operations. For example, if there is a large ratio of reads to writes, early page activations may be disabled for reads. Early page activations may also be disabled for a large hit rate occurring in the last-level cache of a processor. For this condition, a cache controller may send the last level cache (LLC) hit rate to a memory controller so that the memory controller may factor in the LLC hit rate when determining whether to disable the early page activation functionality.

In one embodiment, early page activations may be disabled by either a processor 201 or by a memory controller 203 if the number of early page activations exceeds a predetermined threshold during a predetermined time interval because power may be wasted in comparison to any improvement in performance that may be gained by the early page activations.

Another embodiment may provide system-level feedback (or feedback message) to a processor from the interconnect and/or a memory controller that may be used to regulate the number of early page requests sent by the processor. The feedback may be provided as an out-of-band signal or through the interconnect. Additionally, feedback to a processor may also be provided from a cache controller based on hits in a last-level cache. In one embodiment, a memory controller may send feedback to a processor indicating that the memory controller is not responding to or acting upon the early page requests.

Figure 4:
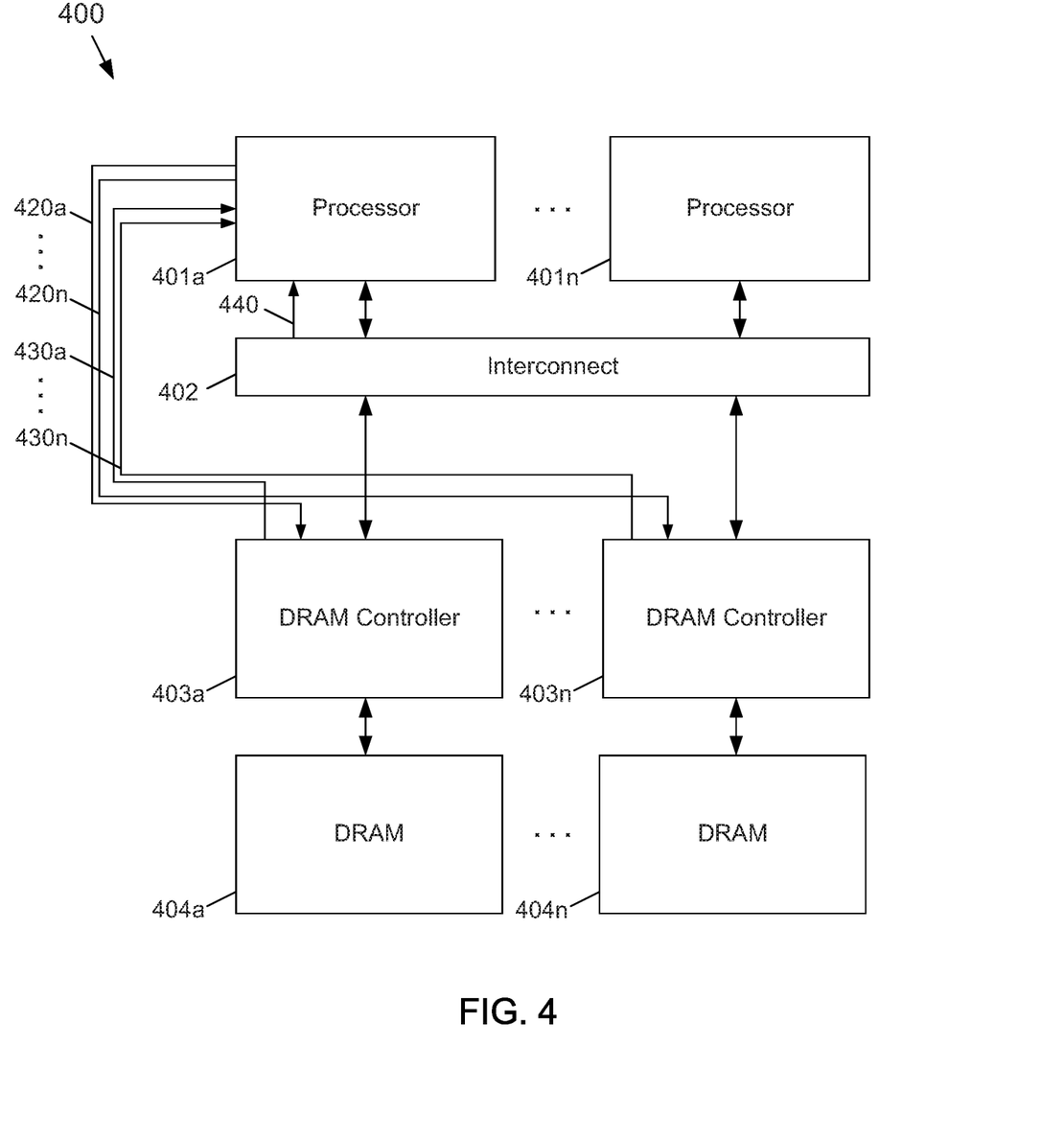
FIG. 4 depicts a functional block diagram of another example embodiment of a computing system according to the subject matter disclosed herein.

FIG. 4 depicts a functional block diagram of another example embodiment of a computing system 400 according to the subject matter disclosed herein. In one embodiment, the computing system 400 may be configured as an SoC. The computing system 400 may include one or more processors 401a-401n, an interconnect 402, one or more memory (DRAM) controllers 403a-403n, and one or more memories 404a-404n. The interconnect 402 may be a coherent interconnect or non-coherent interconnect. The memories 404 may be dynamic random access memory (DRAM). In one embodiment, a memory controller 403 and a corresponding memory 404 may be embodied as a memory module.

The computing system 400 may also include out-of-band signaling lines 420a-420n that bypass the interconnect 402 to provide an early page activation request (or hint request) from a processor 401 directly to a memory controller 403. Feedback may be provided to a processor 401 from the respective memory controllers 403 over out-of-band signaling lines 430a-430n. It should be understood that although the out-of-band signaling lines 420a-420n and 430a-430n are depicted for only processor 401a, corresponding out-of-band signaling lines 420a-420n and 430a-430n may be provided for one or more of the other processors 401b-401n.

Feedback may also be provided by interconnect 402 over an out-of-band signaling line 440.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A system, comprising:
a memory controller;
an interconnect coupled to the memory controller; and
a processor coupled to the memory controller through a first path and a second path, the first path being through the interconnect and the second path bypassing the interconnect, the processor sending a first memory access request to the memory controller via the first path and receiving at least one response corresponding to the first memory access request from the memory controller via the first path, the processor sending concurrently a second memory access request to the memory controller via the first path and a page activation request to the memory controller via the second path, and the processor receiving a first feedback message via the second path in response to the page activation request sent via the second path that regulates a number of page activation requests that are sent by the processor.

2. The system of claim 1, wherein the processor further dynamically determines whether to send a third memory access request via the second path based on a type of the third memory access request or a current power or performance state of the system.

3. The system of claim 1, further comprising a memory coupled to the memory controller,
wherein the processor sends the page activation request via the second path, the page activation request including a page address, and
wherein the memory controller determines whether a page of the memory corresponding to the second memory access request is already open, and activates a page of the memory associated with the page address prior to accessing the memory in response to the second memory access request based on the memory controller determining that the page of the memory corresponding to the second memory access request is not already open.

4. The system of claim 1, further comprising a memory coupled to the memory controller,
wherein the processor sends the page activation request via the second path, the page activation request including a page address, and
wherein the memory controller ignores the page activation request prior to accessing the memory in response to the second memory access request.

5. The system of claim 1, wherein the memory controller sends the first feedback message to the processor.

6. A computing system, comprising:
a processor;
a coherent interconnect coupled to the processor; and
a memory controller coupled to the processor through a first path and a second path, the first path being through the coherent interconnect and the second path bypassing the coherent interconnect, the memory controller receiving a first memory access request from the processor via the first path and sending a response to the first memory access request to the processor via the first path, the memory controller receiving a second memory access request from the processor via the first path and receiving a page activation request via the second path, the second memory access request received via the first path and the page activation request received via the second path being sent concurrently by the processor, the processor receiving a first feedback message via the second path in response to the page activation request sent via the second path that regulates a number of page activation requests that are sent by the processor.

7. The computing system of claim 6, wherein the memory controller further dynamically determines whether to respond to the second memory access request via the second path based on a type of the second memory access request or a current power/performance state of the computing system.

8. The computing system of claim 6, wherein the memory controller receives the page activation request via the second path, the page activation request including a page address, and wherein the memory controller further determines whether a page of a memory corresponding to the second memory access request is already open, and activates a page of a memory associated with the page address prior to accessing the memory in response to the second memory access request based on the memory controller determining that the page of the memory corresponding to the second memory access request is not already open.

9. The computing system of claim 6, wherein the memory controller receives the page activation request via the second path, the page activation request including a page address, and wherein the memory controller further ignores the page activation request prior to accessing a memory in response to the second memory access request.

10. The computing system of claim 6, wherein the memory controller sends the first feedback message to the processor.

11. A method to access a memory, comprising:

receiving at a memory controller a page activation request over a first path that was sent to the memory controller concurrently with a memory access request over a second path, the first path bypassing an interconnect connected to the memory controller and the second path being through the interconnect, the page activation request including a page address; and activating, by the memory controller, a page of the memory corresponding to the page address in response to the page activation request prior to accessing the memory in response to the memory access request based on the memory controller determining that the page of the memory corresponding to the page activation request is not already open;

responding, by the memory controller, to the memory access request by sending data corresponding to the memory access request over the second path; and sending by the memory controller via the first path a feedback message in response to the page activation request received over the first path that regulates a number of page activation requests that are sent to the memory controller.

12. The method of claim 11, further comprising dynamically determining by the memory controller whether to respond to the memory access request via the second path based on a type of the memory access request or a current power or performance state of the memory controller.

13. The method of claim 11, further comprising ignoring by the memory controller the page activation request based on the memory controller determining that the page activation request is to be ignored.

14. The method of claim 11, wherein the page activation request was sent by a processor.

15. The system of claim 1, wherein the interconnect sends a second feedback message to the processor.

16. The computing system of claim 6, wherein coherent interconnect sends a second feedback message to the processor.

* * * * *